United States Patent [19]

Bruer et al.

[11] Patent Number: 4,580,398
[45] Date of Patent: Apr. 8, 1986

[54] APPARATUS AND METHOD FOR ROLLING AND WRAPPING A CYLINDRICAL BALE OF CROPS

[75] Inventors: Dirk Bruer, Harsewinkel; Karl Moosbrucker, Saulgau, both of Fed. Rep. of Germany

[73] Assignee: Claas OHG, Fed. Rep. of Germany

[21] Appl. No.: 592,649

[22] Filed: Mar. 23, 1984

[30] Foreign Application Priority Data

Mar. 29, 1983 [DE] Fed. Rep. of Germany ....... 3311330

[51] Int. Cl.⁴ .............................................. A01D 91/00
[52] U.S. Cl. .................. 56/341; 56/DIG. 2; 100/5
[58] Field of Search ........... 56/341, 343, 344, DIG. 2; 100/88, 89, 5, 76

[56] References Cited

U.S. PATENT DOCUMENTS

| | | | |
|---|---|---|---|
| 4,057,954 | 11/1977 | Mast | 56/341 |
| 4,407,113 | 10/1983 | Core | 56/341 |
| 4,409,784 | 10/1983 | VanGinhoven | 56/341 |

FOREIGN PATENT DOCUMENTS

| | | | |
|---|---|---|---|
| 2634638 | 2/1978 | Fed. Rep. of Germany | 56/341 |
| 2740299 | 3/1979 | Fed. Rep. of Germany | 56/341 |

Primary Examiner—Jay N. Eskovitz
Attorney, Agent, or Firm—Pollock, Vande Sande & Priddy

[57] ABSTRACT

Apparatus and method for rolling and wrapping a crop bale are described. A baling press including a rolling chamber has an interior circumference lined with rotating conveyor elements. A crop entry port receives cut crops as well as a wrapping material. During a final layer formation of the bale, the crop material is fed to the entry port to roll with the baled crop exiting said entry port.

6 Claims, 4 Drawing Figures

APPARATUS AND METHOD FOR ROLLING AND WRAPPING A CYLINDRICAL BALE OF CROPS

BACKGROUND OF THE INVENTION

The present invention relates to a process and apparatus for rolling and wrapping a cylindrical bale of crops. Specifically, a roll baling press is described having a rolling chamber which includes a plurality of rotating conveyor elements disposed on the interior thereof, and further includes a wrapping unit for supplying material for wrapping the rolled crops.

In a known process for rolling and wrapping a cylindrical bale of crops, in accordance with German Pat. No. DE-OS 29 30590, a rolling press is provided which will wrap the circumference of a rolled bale by starting the loose end of the wrapping material into rolling relationship with the bale. However, the process described in the aforementioned reference has the disadvantage that the actual rolling process lasts a relatively long time and a relatively large amount of wrapping material is used. Additionally, the feeding of crops to the rolling press must be interrupted for at least one full bale rotation, and for a time thereafter, during which the covering part of the wrapping material is applied. Rolling presses which include antechambers preceding the rolling press are also subject to a disadvantage in that the antechamber must be inordinately large because of the long interruption time for the crop feed to the rolling chamber. For roll baling presses without an antechamber, the feeding of crops must be interrupted. The foregoing difficulties have led to the design of the present invention, whereby a process and apparatus for rolling and wrapping cylindrical bales of crops are provided which includes a short time of interruption of the crop feed to the rolling chamber.

SUMMARY OF THE INVENTION

It is an object of the invention to apply wrapping material during a baling process to an outside crop layer formed in the bale.

It is a further object of the invention to provide for a process and apparatus which will permit the crop feed to continue during the wrapping step of a completed crop bale.

These and other objects are accomplished by apparatus and process in accordance with the invention, whereby a relatively short time of interruption of crop feed is incurred during the completion of the bale forming process. With the baling apparatus and method in accordance with the invention, the direction of rotation of the bale roll process is selected such that the upper layer of the crop bale moves from the front side of the rolling chamber to its rear side. A feeding unit is applied to supply the wrapping material through the crop feed entrance of the baling press at a point above the actual entrance position for the crop.

In one embodiment of the invention, a storage or antechamber is provided for the crops before feeding the crops into the rolling press. During the final stages of forming the bale, the bale is wrapped and inflowing crops are held in the antechamber until the wrapping process is completed. Additionally, a blocking device for maintaining the received crop in the rolling chamber during the wrapping process is coordinated with the storage chamber. The storage chamber may also include a conveyor and pressing rollers, arranged parallel to each other, which have a direction of rotation selectable to either convey crops into the rolling press or store them when operated in a reverse direction in the antechamber.

DESCRIPTION OF THE EMBODIMENTS

Figure 1:
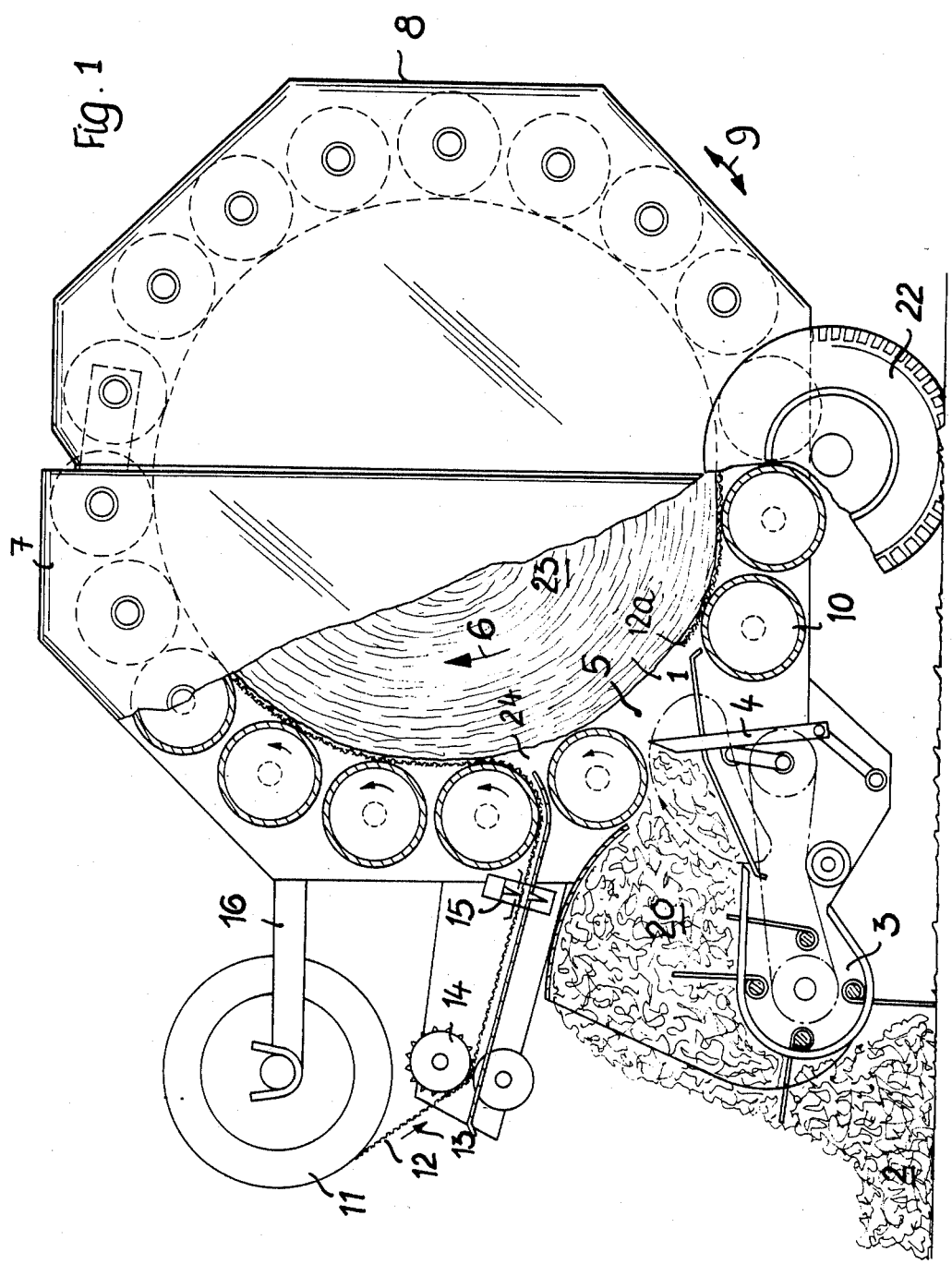
FIG. 1 is a partially section view of a first embodiment of a roll baling press in accordance with the present invention.

Referring now generally to FIGS. 1 through 4, the various Figures include reference numerals identifying similar parts appearing in multiple embodiments.

Turning now specifically to FIG. 1, a roll baling press is shown having two lateral running wheels 22. The rolling press includes a front housing area 7 of a rigid material, and a back housing area 8 which can be opened upward in the direction of the double arrow 9. When opened, the rolled bale 23 may be discharged. A plurality of cylinders 10 line the interior of the rolling chamber 1, and transport, as a result of rotation thereof, inflowing crops 2 in the direction of the arrow 6. The inflowing crops 2 are received on a drum 3 and enter an antechamber 20. The antechamber 20 feeds the crops 2 by means of a gatherer 4 through an entry port 5 into the rolling chamber 1, the rolling chamber including the interior cylinders 10. The gatherer 4 can also be used for inhibiting the crop feed from the storage area 20 to the rolling chamber 1.

Included above the crop entry port 5 and adjacent thereto is an entry location 24, through which wrapping material 12 is fed to the rolling chamber, when the rolled bale is finished rolling. The wrapping material is maintained on a storage drum 11, mounted for rotation on holder 16 at the front end of the rolling bale press. The wrapping material 12 runs in the direction of the arrow 13 through a counter 14, and a cutting device, as well as the entry location 24 to the circumference of the almost finished bale. As soon as the leading edge 12a of the wrapping material 12 reaches the entry port 5, the feeding of crop 2 is inhibited by the cam controlled gatherer 4 remaining in its upper position for a long enough time until the leading end 12a of the wrapping material overlaps with the end of the wrapping material cut by the cutting device 15 in the area adjacent entry location 24. The rolled and wrapped bale can thus be discharged towards the back of the chamber as soon as the housing 8 is opened.

Figure 2:
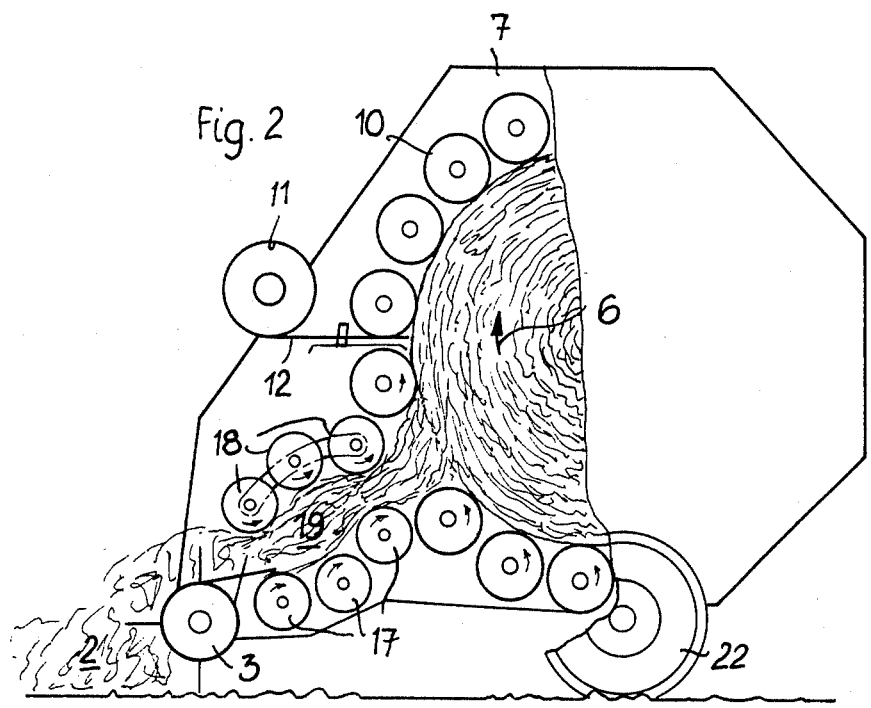
FIG. 2 is another section view of yet another roll baling press in accordance with the present invention, which includes an antechamber with rollers for feeding the crops.
Figure 3:
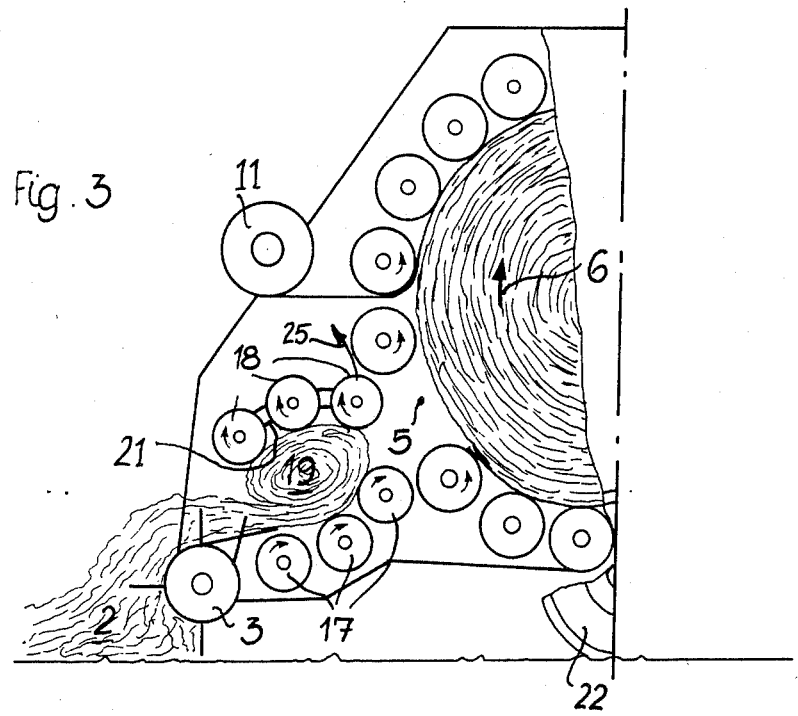
FIG. 3 is another view of the rolling press according to FIG. 2 during the final stages of baling the crops.

Referring now to the embodiments according to FIGS. 2 and 3, the roll baling press is similar to that of FIG. 1. However, the embodiments of FIGS. 2 and 3 include an antechamber 19, bordered by lower cylinders 17 arranged next to each other as well as upper cylinders 18 arranged next to each other. The direction of rotation of cylinders 17 or 18 can be reversed. During the normal feed of crop, rollers 17 and 18 feed it into the rolling chamber 1. As soon as the front edge of the wrapping material 12 reaches the entry port 5, and the gatherer 4 is motionless, the direction of rotation of rollers 17 and 18 is reversed and a small rolled bale accumulates in the antechamber 19. The material accumulating in the antechamber 19 is transported into the rolling chamber when the direction of rotation is reversed according to FIG. 2. The area within antechamber 19 can be increased when the three upper cylinders 18 are installed on a common carrier 21 which includes means for swivelling the common carrier upwards in the direction of the arrow 25 as shown.

Figure 4:
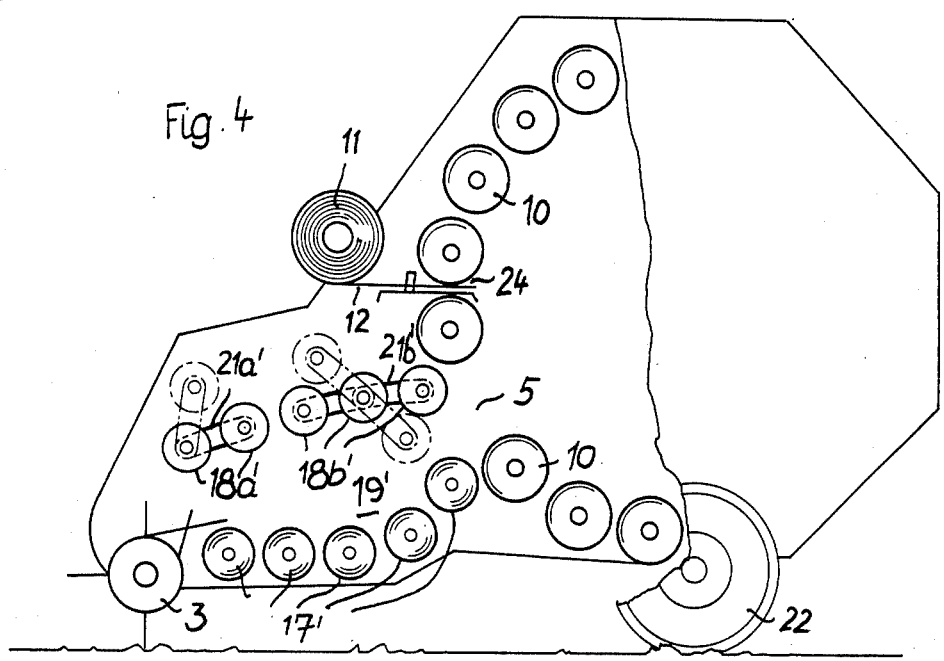
FIG. 4 is a schematic view of yet another embodiment.

In the third described embodiment of FIG. 4, the antechamber 19' is similar to that of FIGS. 2 and 3. However, the third embodiment antechamber 19' is bordered by five lower cylinders 17' and by five upper cylinders, 18a' and 18b'. The two upper cylinders 18a' and 18b' are pivotally fixed around the swivel axis of the front cylinder of carrier 21a. The three upper back cylinders 18b' are also included on frame 21b' and pivotal about the turning axis of the center cylinder.

Thus, there has been described with respect to four embodiments a crop baling apparatus and process therefor which will receive crops, bale the same and wrap the same with a minimum reduction in crop throughout. Those skilled in the art will recognize yet other embodiments described more particularly by the claims which follow.

What is claimed is:

1. A roll baling press for crops comprising:
   a rolling chamber having a cylindrical interior surface, an exit opening for discharging a bale of crops, and an entry opening opposite said exit opening for receiving crops to be baled;
   a plurality of rotating conveying elements located around said cylindrical interior surface;
   a wrap material feed means located above said entry opening for feeding one end of a wrap material in a direction away from said entry opening around the circumference of a baled crop in said rolling chamber while continuing to receive crops through said entry opening until said one end reaches said entry opening completely wrapping said baled crops; and
   an antechamber for feeding crops to be baled to said entry opening, said antechamber including cylindrical rollers for pressing and feeding crops to said entry opening, said cylindrical rollers being operable to rotate in forward and reverse rotational directions, said forward direction feeding said crops to said entry opening, until said bale is wrapped over a major portion of its circumference by said material and then said rollers being rotated in a reverse direction to accumulate crops in said antechamber while inhibiting crops from flowing to said entry port while said bale wrapping is completed for the remaining portion of said bale's circumference, providing for only a momentary interruption of the feeding of said crops to said rolling chamber.

2. A method of rolling and wrapping a crop bale comprising:
   supplying a quantity of crops to be baled through an antechamber into an entry port of a rolling baling press by transporting said rolling baling press over said crops, said rolling baling press including a rolling chamber bordered by rotating conveyor elements for baling crops received from said antechamber, and including a discharge opening;
   supplying one end of a continuous length of wrapping material into said baling chamber adjacent said entry port during baling of said crops in a direction along the interior circumference of said rolling baling press away from said entry port, whereby said wrapping material is conveyed over said crops until reaching said entry port;
   interrupting the flow of crops into said entry port for a brief period to permit said one end of wrapping material to progress to substantially the position of entry of said end into said rolling chamber while continuing to receive crops in said antechamber; whereby said crop feeding to said rolling chamber is only momentarily interrupted to complete wrapping of said baled crops; and
   discharging said wrapped baled crops from said discharge opening.

3. A roll baling press for crops comprising:
   a rolling chamber including around an interior circumference thereof a plurality of rotating conveying elements;
   a crop entry port at one end of said rolling chamber for receiving crops to be baled;
   a wrapping material supply means located above said entry port for supplying an end of said wrapping material to the interior of said baling chamber above said entry port in a direction away from said entry port, whereby said wrapping material during baling of said crops, is conveyed around the circumference of a crop bale to said entry port; and
   an antechamber for receiving cut crops and forwarding said cut crops to said rolling chamber crop entry port, said antechamber having means for momentarily inhibiting forwarding of crops to said crop entry port when said wrapping material end reaches said entry port, said antechamber accumulating a small bale of crops while said wrapping material traverses said entry port.

4. A method of rolling and wrapping a crop bale comprising:
   continuously supplying cut crops without interruption into an antechamber inlet;
   supplying crops from an outlet of said antechamber to an entry port of a baling press, said baling press having a rolling chamber bordered by rotating conveyor elements for baling said crops; and,
   feeding one end of a continuous length of wrapping material through a port adjacent said entry port in a direction away from said entry port around the circumference of a crop being baled, and momentarily inhibiting the supply of crops exiting said antechamber when said end passes said entry port to completely wrap said crops, whereby during the time said end traverses said entry port, a small bale accumulates in said antechamber, avoiding the necessity of interrupting the supply of crops during baling and wrapping said crops.

5. The roll baling press of claim 3 wherein said antechamber means for inhibiting comprises transport and pressing cylinders, said cylinders being rotatable in first and second directions, whereby said cylinders when rotating in a first direction feed said crops to said entry port, and in a second rotation direction forms a small bale in said antechamber.

6. The roll baling press of claim 5 wherein said transport and pressing cylinders are supported on a movable carrier for vertical movement in said antechamber.

* * * * *